(12) United States Patent
Alvanos

(10) Patent No.: US 10,550,699 B2
(45) Date of Patent: Feb. 4, 2020

(54) PRETRENCHED ROTOR FOR GAS TURBINE ENGINE

(71) Applicant: United Technologies Corporation, Hartford, CT (US)

(72) Inventor: Ioannis Alvanos, West Springfield, MA (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 321 days.

(21) Appl. No.: 14/773,200

(22) PCT Filed: Feb. 13, 2014

(86) PCT No.: PCT/US2014/016240
§ 371 (c)(1),
(2) Date: Sep. 4, 2015

(87) PCT Pub. No.: WO2014/189564
PCT Pub. Date: Nov. 27, 2014

(65) Prior Publication Data
US 2016/0010460 A1    Jan. 14, 2016

Related U.S. Application Data

(60) Provisional application No. 61/773,278, filed on Mar. 6, 2013.

(51) Int. Cl.
*F01D 5/14* (2006.01)
*F01D 11/00* (2006.01)
(Continued)

(52) U.S. Cl.
CPC ............ *F01D 5/143* (2013.01); *F01D 11/001* (2013.01); *F04D 29/164* (2013.01);
(Continued)

(58) Field of Classification Search
CPC .......... F01D 5/143; F01D 11/001; F01D 5/02; F01D 9/041; F04D 29/64; F04D 29/321;
(Continued)

(56) References Cited

U.S. PATENT DOCUMENTS 4,238,170 A    12/1980  Robideau et al.
4,645,417 A *  2/1987   Wisler .................... F01D 11/08
                                          415/173.1
(Continued)

FOREIGN PATENT DOCUMENTS

EP    0194957    9/1986
EP    0475771    3/1992

OTHER PUBLICATIONS

International Preliminary Report on Patentability for PCT Application No. PCT/US2014/016240, dated Sep. 17, 2015.
(Continued)

*Primary Examiner* — Laert Dounis
*Assistant Examiner* — Kelsey L Stanek
(74) *Attorney, Agent, or Firm* — Carlson, Gaskey & Olds, P.C.

(57) ABSTRACT

A gas turbine engine according to an exemplary aspect of the present disclosure includes, among other things, a rotor having a pretrench that receives at least a portion of a tip of a stator, the portion of the tip extending radially into the pretrench.

21 Claims, 3 Drawing Sheets

(51) Int. Cl.
*F04D 29/16* (2006.01)
*F04D 29/32* (2006.01)
*F04D 29/54* (2006.01)

(52) U.S. Cl.
CPC .......... *F04D 29/321* (2013.01); *F04D 29/542* (2013.01); *F04D 29/329* (2013.01); *Y02T 50/673* (2013.01)

(58) Field of Classification Search
CPC .... F04D 29/542; F04D 29/329; F04D 29/083; Y02T 50/673
USPC ............. 415/208.1, 170 R, 173.5; 29/889.21
See application file for complete search history.

(56) References Cited

U.S. PATENT DOCUMENTS

| | | | |
|---|---|---|---|
| 4,738,586 A * | 4/1988 | Harter | F01D 5/20 415/173.5 |
| 4,884,820 A | 12/1989 | Jackson et al. | |
| 7,241,108 B2 | 7/2007 | Lewis | |
| 8,177,502 B2 * | 5/2012 | Headley | F01D 9/041 415/209.3 |
| 2003/0035715 A1 | 2/2003 | Torrance | |
| 2009/0214335 A1 | 8/2009 | Long | |
| 2009/0274552 A1 | 11/2009 | Konter et al. | |
| 2012/0051938 A1 * | 3/2012 | Bertoli | F01D 5/225 416/241 R |
| 2013/0064673 A1 * | 3/2013 | Domercq | F04D 29/321 416/223 R |
| 2013/0259651 A1 * | 10/2013 | Kupratis | F02C 3/113 415/122.1 |
| 2014/0150401 A1 * | 6/2014 | Venter | F02C 7/36 60/39.45 |
| 2015/0345398 A1 * | 12/2015 | McCune | F01D 25/164 417/374 |

OTHER PUBLICATIONS

International Search Report and Written Opinion for PCT Application No. PCT/US2014/016240 dated Dec. 12, 2014.

* cited by examiner

PRETRENCHED ROTOR FOR GAS TURBINE ENGINE

BACKGROUND

A gas turbine engine typically includes a fan section, a compressor section, a combustor section, and a turbine section. Air entering the compressor section is compressed and delivered into the combustion section where it is mixed with fuel and ignited to generate a high-temperature exhaust gas flow. The high-temperature exhaust gas flow expands through the turbine section to drive the compressor and the fan section. The compressor section typically includes at least low and high pressure compressors, and the turbine section typically includes at least low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A speed reduction device such as an epicyclical gear assembly may be utilized to drive the fan section such that the fan section may rotate at a speed different and typically slower than the turbine section so as to provide a reduced part count approach for increasing the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Although geared architectures utilized to drive the fan have improved propulsive efficiency, turbine engine manufacturers continue to seek further improvements to engine performance including improvements to thermal, transfer, and propulsive efficiencies.

SUMMARY

A gas turbine engine according to an exemplary aspect of the present disclosure includes, among other things, a rotor having a pretrench that receives at least a portion of a tip of a stator, the portion of the tip extending radially into the pretrench.

In a further non-limiting embodiment of the foregoing gas turbine engine, the rotor is a compressor rotor.

In a further non-limiting embodiment of any of the foregoing gas turbine engines, an outer wall of the rotor extends generally linearly from a base of a rotor blade to the pretrench, the rotor blade directly adjacent axially to the stator.

In a further non-limiting embodiment of any of the foregoing gas turbine engines, the stator extends radially from a position radially outside a base of a rotor blade to a position radially inside the base, the rotor blade directly adjacent axially to the stator.

In a further non-limiting embodiment of any of the foregoing gas turbine engines, an outer wall section of the rotor extends from a base of a rotor blade upstream the pretrench to a base of a rotor blade downstream the pretrench, wherein a floor of the pretrench is closer to a rotational axis of the rotor than any other portion of the outer wall section.

In a further non-limiting embodiment of any of the foregoing gas turbine engines, the stator is a cantilevered stator.

In a further non-limiting embodiment of any of the foregoing gas turbine engines, a maximum radial depth of the pretrench is 50 percent of the thickness of the rotor arm at a forwardmost portion of the pretrench.

In a further non-limiting embodiment of any of the foregoing gas turbine engines, the engine includes an upstream side and a downstream side of the pretrench, the upstream side and the downstream side both angled relative to a radial axis having an angle up to 90 degrees.

In a further non-limiting embodiment of any of the foregoing gas turbine engines, the rotor is a rotor of a geared gas turbine engine.

In a further non-limiting embodiment of any of the foregoing gas turbine engines, a floor of the pretrench is generally linear.

In a further non-limiting embodiment of any of the foregoing gas turbine engines, the pretrench is annular.

A gas turbine engine assembly according to another exemplary aspect of the present disclosure includes, among other things, a compressor section; a rotor of the compressor section; an outer wall section of the rotor extending between a first array of blades and a second array of blades that is axially adjacent to the first array of blades; and a pretrench of the outer wall section, the pretrench configured to receive a stator tip, the pretrench extending radially inward further than any other portion of the outer wall section.

In a further non-limiting embodiment of the foregoing gas turbine engine assembly, the compressor is a high pressure compressor.

In a further non-limiting embodiment of any of the foregoing gas turbine engine assemblies, the outer wall section of the rotor extends generally linearly from a base of a rotor blades that are upstream from the pretrench to the pretrench.

In a further non-limiting embodiment of any of the foregoing gas turbine engine assemblies, the stator extends radially from a position radially outside base of the first array of blades to a position radially inside the bases.

In a further non-limiting embodiment of any of the foregoing gas turbine engine assemblies, a maximum radial depth of the pretrench is 50% of the thickness of the rotor at a leading edge of the pretrench.

In a further non-limiting embodiment of any of the foregoing gas turbine engine assemblies, the rotor is a rotor of a geared gas turbine engine.

A method of providing a rotor of a gas turbine engine, according to an exemplary aspect of the present disclosure includes, among other things, providing a rotor having an annular pretrench configured to receive tips of an array of cantilevered stators.

In a further non-limiting embodiment of the foregoing method, the rotor is a compressor rotor.

In a further non-limiting embodiment of any of the foregoing methods, an outer wall section of the rotor extends from a base of a rotor blade upstream the annular pretrench to a base of a rotor blade downstream the annular pretrench, a floor of the annular pretrench being closer to a rotational axis of the rotor than any other portion of the outer wall section.

These and other features of this disclosure will be best understood from the following specification and drawings, the following of which is a brief description.

DETAILED DESCRIPTION

Figure 1:
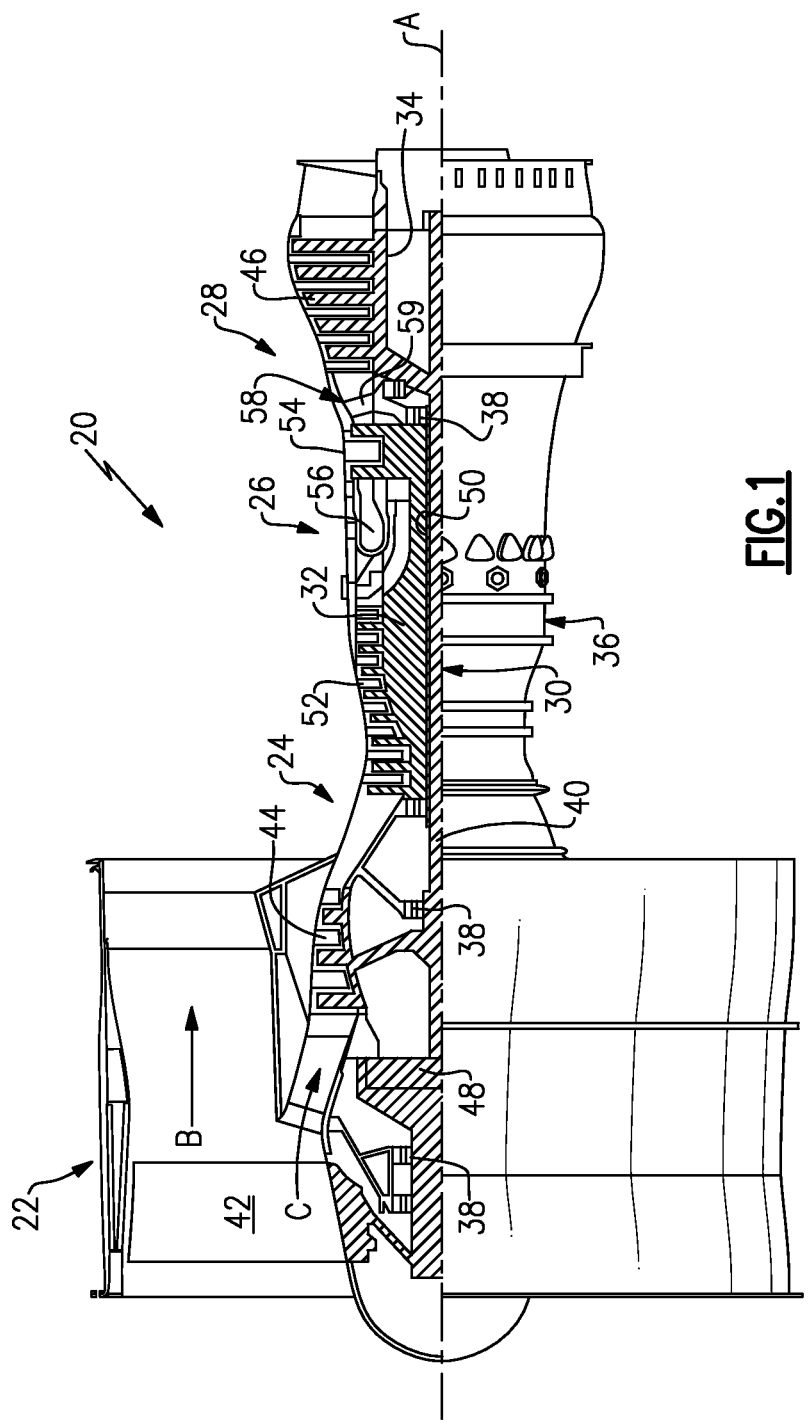
FIG. 1 shows an example gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 59, which are in the core airflow path and function as an inlet guide vane for the low pressure turbine 46. Utilizing the vane 59 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ("TSFC")"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The use of the gear reduction between the low speed spool 30 and the fan 42 allows an increase of speed to the low pressure turbine 46. In the past, the speed of the low pressure turbine 46 and the low pressure compressor 44 has been somewhat limited in that the fan speed cannot be unduly large. The maximum fan speed is at its outer tip, and in larger engines, the fan diameter is much larger than it may be in smaller power engines. However, the use of the gear reduction has freed the designer from limitation on the speeds of the low pressure turbine 46 and the low pressure compressor 44 speeds caused by a desire to not have unduly high fan speeds.

Figure 2:
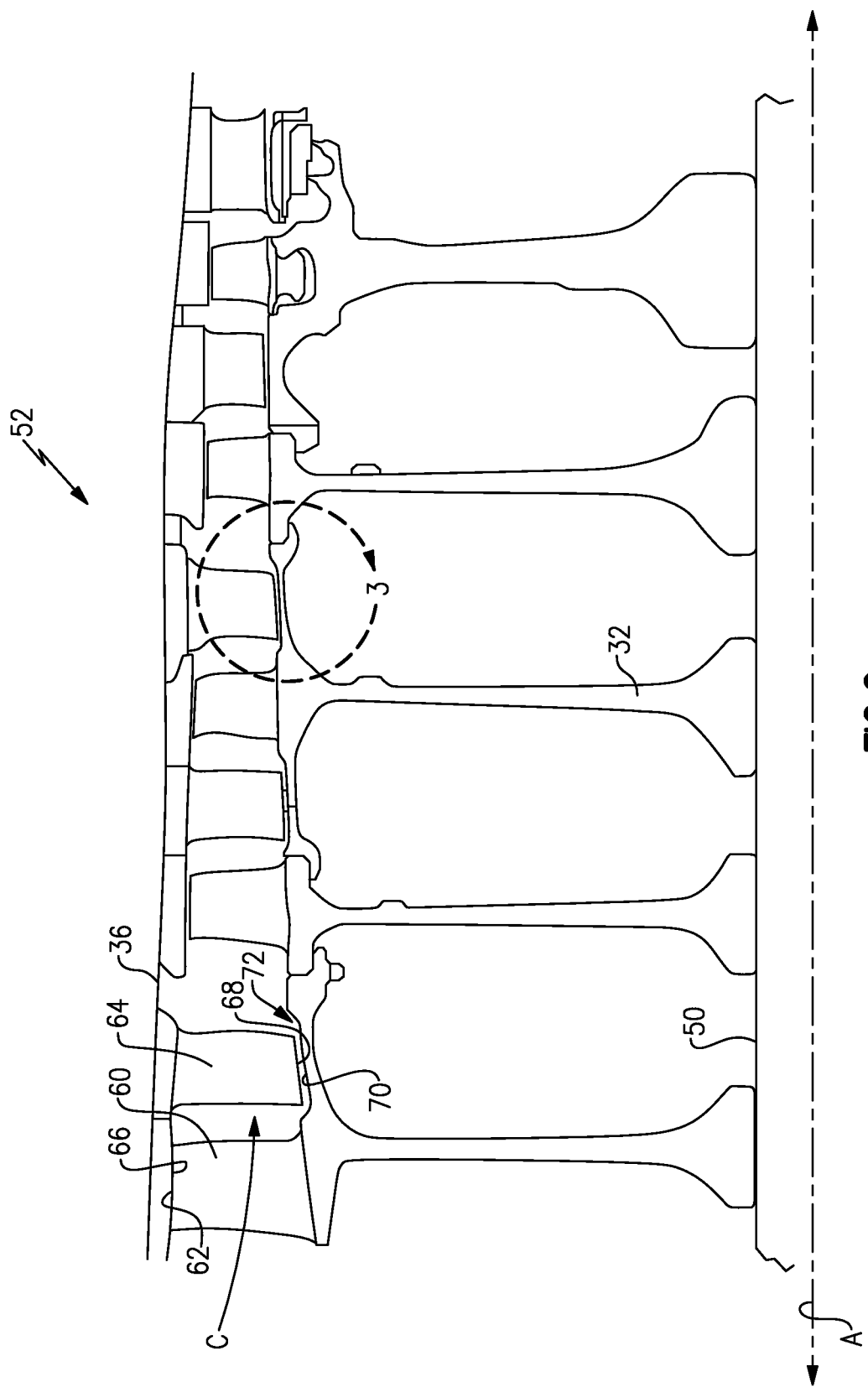
FIG. 2 shows a close up view of a compressor section of the gas turbine engine of FIG. 1.
Figure 3:
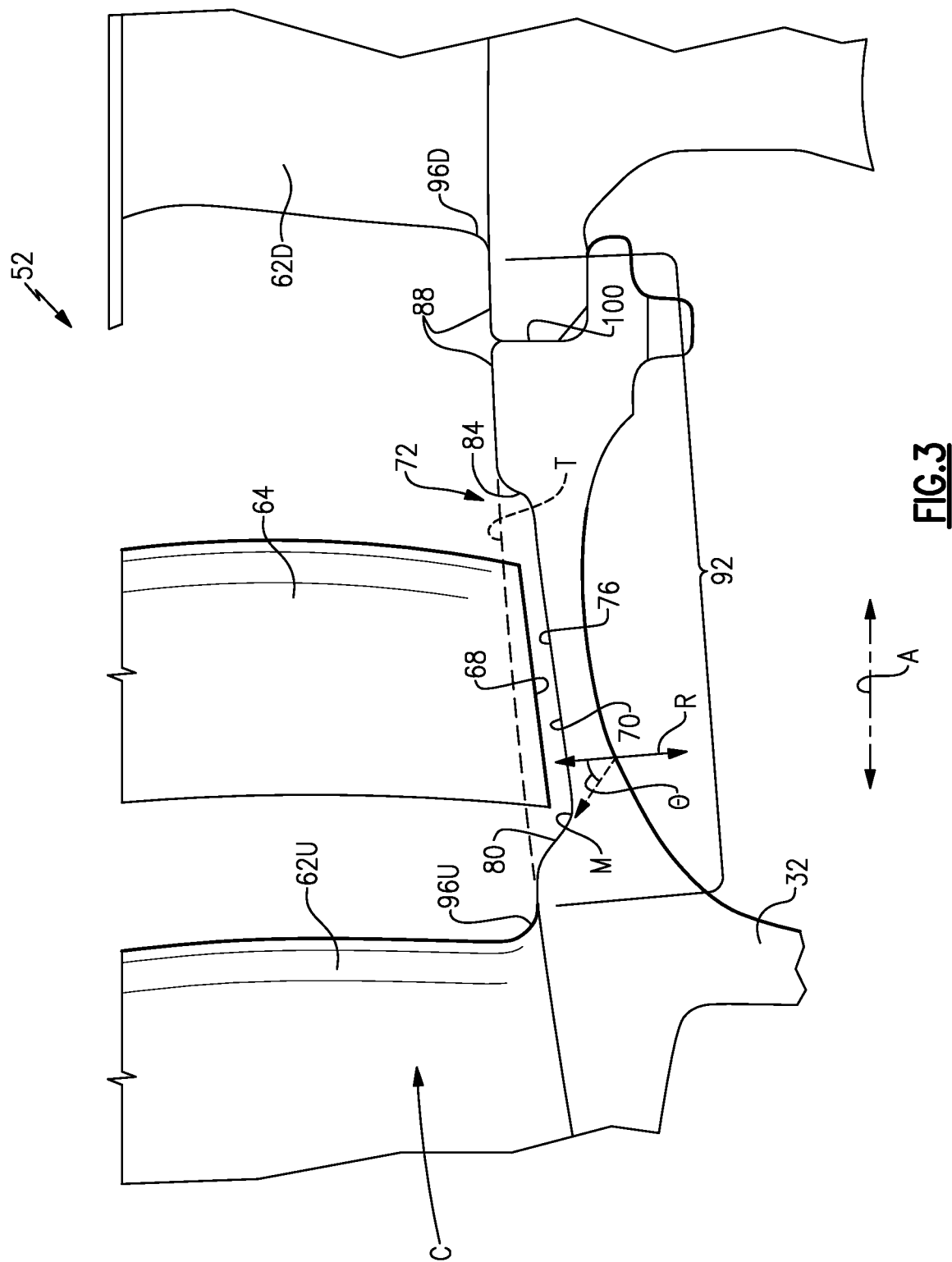
FIG. 3 is a close-up view of a pretrench of the compressor section of FIG. 2.

Referring now to FIGS. 2 and 3 with continuing reference to FIG. 1, the high pressure compressor 52 includes various axially sequential stages. Each of the stages includes a circumferentially distributed array of blades 60 axially adjacent a circumferentially distributed array of stators 64.

The blades 60 and stators 64 extend radially across the core flowpath of the engine 20. The blades 60 extend outward from the axis A. The stators 64 extend inward toward the axis A. The blades 60 rotate with portions of the high speed spool 32. The stators 64 do not rotate and are attached to static structure 36. The example stators 64 are typically referred to as cantilevered stators based on being anchored only on one end.

During operation, tips 62 of the example blades 60 seal against blade outer air seals 66 secured to the static structure 36 of the engine 20. Tips 68 of the stators 64 seal against seal lands 70 of the high speed spool 32. In some examples, the tips 68 rub against the seal lands 70. In other examples, the tips 68 are spaced from the seal lands 70 during operation.

The blades 60 and the seal lands 70 can be considered portions of a rotor as they rotate relative to the static structure 36 during operation. The stators 64 and blade outer air seals 66 are stationary during operation.

At least a portion of the example tips 68, as illustrated in FIG. 3, are received within a corresponding pretrench 72 of the rotor. The seal lands 70 are provided at least partially within the pretrench 72. The boundaries of the pretrench 72 are generally provided by an outer diameter 76 of the rotor, an upstream side 80, and a downstream side 84. The outer diameter surface 76 extends generally linearly from the upstream side 80 to the downstream side 84. The pretrench 72 is an annular trench and extends circumferentially about the axis. The pretrench 72 is formed within the outer diameter surface 76 of the rotor. That is, the pretrench 72 is formed to avoid the stator 64 from rubbing against the rotor during operation of the engine 20.

In this example, the rotor has an outer wall 88. The pretrench 72 is an area of the outer wall 88 that is recessed radially relative to other portions of the outer wall 88. In FIG. 3, line T represents the radially outer boundary of the pretrench 72. The line T extends from the forwardmost portion of the upstream side 80 to the aftmost portion of the downstream side 84. The tips 68 are considered to be received into the pretrench 72 because the tips 68 extends radially past the line T.

In this example, a section 92 of the outer wall 88 extends from a base 96U of a blade 62U that is upstream the pretrench 72 to a base 96D of a blade 62D that is downstream from the pretrench 72. The section 92 thus represents the outer wall 88 that is position between axially adjacent blades 62U and 62D.

The outer diameter 76 of the pretrench 72 that is axially between the adjacent blades 62U and 62D is closer to the axis A than any other portion of the section 92. Since the tip 68 extends radially into the pretrench 72, portions of the outer wall 88 within the section 92 extend radially outward past the tip 68. Also, the tip 68 extends from a position radially outside the bases 96U and 96D to a position radially inside the bases 96U and 96D.

Within the outer wall section 92, the outer wall 88 extends generally smoothly and linearly from the base 96U to the upstream side 80. The outer wall 88 also extends generally smoothly from the downstream side 84 to the base 96D.

In some examples, the outer wall 88 includes interruptions or slight depressions in these areas due to interfacing stages of the high speed spool 32, such as at the interface 100. Generally, however, there are not depressions extending radially past the pretrench 72.

In this example, the upstream side 80 and the downstream side 84 have an angle θ relative to a radial line R. The angle may be up to 90 degrees in some examples.

In this example, the pretrench 72 has a maximum radial depth M that is 50 percent of the thickness of the rotor arm at a forwardmost portion of the pretrench 72, which, in this example, is the forwardmost portion of the upstream side 80.

During operation, after the core airflow C moves past the blade 62U, the airflow moves between circumferentially adjacent stators 64 or moves through the pretrench 72 radially between the tips 68 and the outer diameter 76.

The pretrench 72 and tips 68 influence airflow. Airflow moving between the pretrench 72 and the tips 68 follows a relatively tortuous path. The path causes vortices of airflow to form around the area of the tip 68 and the pretrench 72 during operation. The vortices essentially block airflow radially between the tips 68 and the floor 76, which forces airflow radially upward through the circumferentially adjacent stator 64. The vortices provide an effectively tighter clearance between the tip 68 and the rotor than stators in the prior art.

Notably, the example engine 20 has a split-case design, which facilitates assembly of the stators 64 and rotor with pretrench 72.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A gas turbine engine, comprising:
a rotor defined along a longitudinal axis and having a pretrench that receives at least a portion of a tip of a stator, the portion of the tip extending radially into the pretrench with respect to the longitudinal axis, the pretrench defined in a rotor arm extending from a base of a rotor blade adjacent the stator such that the pretrench is axially spaced apart from the base with respect to the longitudinal axis; and
wherein a maximum radial depth of the pretrench is 50 percent of the thickness of the rotor arm at a forwardmost portion of the pretrench.

2. The gas turbine engine of claim 1, wherein the rotor is a compressor rotor.

3. The gas turbine engine of claim 1, wherein an outer wall of the rotor extends generally linearly from the base of the rotor blade to the pretrench, the rotor blade directly adjacent axially to the stator.

4. The gas turbine engine of claim 1, wherein the stator extends radially from a position radially outside the base of the rotor blade to a position radially inside the base, the rotor blade directly adjacent axially to the stator.

5. The gas turbine engine of claim 1, wherein the rotor blade is a first rotor blade, and an outer wall section of the rotor extends from the base of the first rotor blade upstream the pretrench to a base of a second rotor blade downstream the pretrench, wherein a floor of the pretrench is closer to a rotational axis of the rotor than any other portion of the outer wall section.

6. The gas turbine engine of claim 5, wherein:
the rotor is a compressor rotor;
the stator is a cantilevered stator; and
wherein an upstream side and a downstream side of the pretrench are both angled relative to a radial axis having an angle up to 90 degrees.

7. The gas turbine engine of claim 1, wherein the stator is a cantilevered stator.

8. The gas turbine engine of claim 1, including an upstream side and a downstream side of the pretrench, the upstream side and the downstream side both angled relative to a radial axis having an angle up to 90 degrees.

9. The gas turbine engine of claim 1, wherein the rotor is a rotor of a geared gas turbine engine.

10. The gas turbine engine of claim 1, wherein a floor of the pretrench is generally linear.

11. The gas turbine engine of claim 1, wherein the pretrench is annular.

12. A gas turbine engine assembly, comprising:
a compressor section;
a rotor of the compressor section defined along a longitudinal axis;
an outer wall section of the rotor extending between a first array of rotor blades and a second array of rotor blades that is axially adjacent to the first array of rotor blades with respect to the longitudinal axis; and
a pretrench of the outer wall section that receives a stator tip, the pretrench extending radially inward further than any other portion of the outer wall section with respect to the longitudinal axis, and the pretrench defined in a rotor arm extending from a base of a rotor blade of the first array of rotor blades such that the pretrench is axially spaced apart from the base with respect to the longitudinal axis; and
wherein a maximum radial depth of the pretrench is 50% of the thickness of the rotor at a leading edge of the pretrench.

13. The gas turbine engine of claim 12, wherein the compressor is a high pressure compressor.

14. The gas turbine engine of claim 12, wherein the outer wall section of the rotor extends generally linearly from the base of the rotor blade upstream from the pretrench to the pretrench.

15. The gas turbine engine of claim 12, wherein the stator extends radially from a position radially outside of bases of the first array of blades to a position radially inside the bases.

16. The gas turbine engine of claim 15, wherein:
the rotor arm extends from the base of the rotor blade of the first array of rotor blades axially forward of the pretrench to a base of a rotor blade of the second array of rotor blades axially aft of the pretrench with respect to the longitudinal axis; and
the pretrench includes an upstream side, a downstream side and a floor that extends between the upstream side and the downstream side, and each of the upstream and downstream sides of the pretrench slope from a respective one of the bases towards the floor such that the floor is radially spaced apart from the bases with respect to the longitudinal axis.

17. The gas turbine engine of claim 12, wherein the rotor is a rotor of a geared gas turbine engine.

18. The gas turbine engine assembly of claim 12, wherein an upstream side and a downstream side of the pretrench are both angled relative to a radial axis having an angle up to 90 degrees.

19. A method of providing a rotor of a gas turbine engine, comprising:
providing a rotor defining along a longitudinal axis and having an annular pretrench that receives tips of an array of cantilevered stators, the pretrench defined in a rotor arm extending from a base of a rotor blade such that the pretrench is axially spaced apart from the base with respect to the longitudinal axis; and
wherein a maximum radial depth of the pretrench is 50% of the thickness of the rotor at a leading edge of the pretrench.

20. The method of claim 19, wherein the rotor is a compressor rotor.

21. The method of claim 19, wherein the rotor blade is a first rotor blade, and an outer wall section of the rotor extends from the base of the first rotor blade upstream the annular pretrench to a base of a second rotor blade downstream the annular pretrench, a floor of the annular pretrench being closer to a rotational axis of the rotor than any other portion of the outer wall section.

* * * * *